US012536495B2

(12) United States Patent
Bogolea et al.

(10) Patent No.: US 12,536,495 B2
(45) Date of Patent: Jan. 27, 2026

(54) METHOD FOR CLASSIFYING PRODUCT ORGANIZATION IN AN INVENTORY STRUCTURE

(71) Applicant: Simbe Robotics, Inc., South San Francisco, CA (US)

(72) Inventors: Brad Bogolea, San Francisco, CA (US); Jariullah Safi, San Francisco, CA (US); Kanchan Bahirat, San Francisco, CA (US); Shiva Reddy, San Francisco, CA (US)

(73) Assignee: Simbe Robotics, Inc., South San Francisco, CA (US)

( * ) Notice: Subject to any disclaimer, the term of this patent is extended or adjusted under 35 U.S.C. 154(b) by 352 days.

(21) Appl. No.: 18/101,539

(22) Filed: Jan. 25, 2023

(65) Prior Publication Data

US 2023/0376893 A1    Nov. 23, 2023

Related U.S. Application Data

(63) Continuation-in-part of application No. 17/727,044, filed on Apr. 22, 2022, now Pat. No. 12,248,908, (Continued)

(51) Int. Cl.
*G06Q 10/087*    (2023.01)
*G05D 1/00*    (2024.01)
(Continued)

(52) U.S. Cl.
CPC ......... *G06Q 10/087* (2013.01); *G05D 1/0274* (2013.01); *G05D 1/0282* (2013.01);
(Continued)

(58) Field of Classification Search
CPC ........... G06Q 10/087; G06Q 10/08724; G05D 1/0274; G05D 1/0282; G05D 1/0246;
(Continued)

(56) References Cited

U.S. PATENT DOCUMENTS 10,169,660 B1 *   1/2019   Ren ...................... G06V 10/758
2008/0077511 A1 *  3/2008   Zimmerman ........ G06Q 10/087
705/28

(Continued)

*Primary Examiner* — Florian M Zeender
*Assistant Examiner* — Vanessa Deligi
(74) *Attorney, Agent, or Firm* — Run8 Patent Group, LLC; Peter Miller; Leah Raddatz

(57) ABSTRACT

A method includes: locating a first slot boundary around a first product unit, in an image of an inventory structure in a store, identifies as a first product type based on features detected in the image; extracting a first product identifier, from a first slot tag, detected in the image; based on correspondence between the first product identifier and product type, associating the first slot boundary with the first slot tag and extracting a first relative tag-boundary position of the first slot boundary and slot tag from the image; extracting a second product identifier from a second slot tag detected in the image; predicting a second slot boundary, assigned to a second product type corresponding to the second product identifier, in the image based on a second position of the second tag in the image and the first relative tag-boundary position.

20 Claims, 5 Drawing Sheets

Related U.S. Application Data which is a continuation of application No. 16/578,406, filed on Sep. 23, 2019, now Pat. No. 11,341,454, which is a continuation of application No. 15/600,527, filed on May 19, 2017, now Pat. No. 10,467,587.

(60) Provisional application No. 63/303,833, filed on Jan. 27, 2022, provisional application No. 62/339,039, filed on May 19, 2016.

(51) Int. Cl.
| | |
|---|---|
| *G06F 18/21* | (2023.01) |
| *G06F 18/22* | (2023.01) |
| *G06V 20/52* | (2022.01) |
| *H04N 1/00* | (2006.01) |
| *H04N 23/66* | (2023.01) |
| *H04N 23/698* | (2023.01) |
| *H04N 23/80* | (2023.01) |
| *H04N 25/615* | (2023.01) |

(52) U.S. Cl.
CPC .............. *G06F 18/21* (2023.01); *G06F 18/22* (2023.01); *G06V 20/52* (2022.01); *H04N 1/00* (2013.01); *H04N 23/66* (2023.01); *H04N 23/698* (2023.01); *H04N 23/80* (2023.01); *H04N 25/615* (2023.01); *G05D 1/0246* (2013.01)

(58) Field of Classification Search
CPC .... G05D 1/243; G05D 1/646; G05D 2105/93; G05D 2107/67; G05D 2109/10; G05D 2111/10; G05D 1/246; G06F 18/21; G06F 18/22; G06V 20/52; G06V 10/25; G06V 20/10; G06V 20/40; G06V 20/64; G06V 20/41; G06V 20/49; G06V 10/764; G06V 20/46; H04N 1/00; H04N 23/66; H04N 23/698; H04N 23/80; H04N 25/615; H04N 23/90

See application file for complete search history.

(56) References Cited

U.S. PATENT DOCUMENTS

| | | | |
|---|---|---|---|
| 2009/0043676 A1* | 2/2009 | Riley | G06Q 30/0264 705/26.1 |
| 2015/0088703 A1* | 3/2015 | Yan | G06Q 10/087 705/28 |
| 2015/0262116 A1* | 9/2015 | Katircioglu | G06Q 10/087 705/28 |
| 2015/0363625 A1* | 12/2015 | Wu | G06K 7/1447 382/203 |
| 2016/0171707 A1* | 6/2016 | Schwartz | G06F 18/22 382/180 |
| 2017/0225891 A1* | 8/2017 | Elazary | G05D 1/0234 |
| 2017/0286901 A1* | 10/2017 | Skaff | G06V 10/751 |
| 2017/0293959 A1* | 10/2017 | Itou | G06Q 30/0623 |

\* cited by examiner

METHOD FOR CLASSIFYING PRODUCT ORGANIZATION IN AN INVENTORY STRUCTURE

CROSS-REFERENCE TO RELATED APPLICATIONS

This Application claims the benefit of U.S. Provisional Application No. 63/303,833, filed on 27 Jan. 2022, which is incorporated in its entirety by this reference.

This Application is a continuation-in-part application of U.S. patent application Ser. No. 17/727,044, filed on 22 Apr. 2022, which is a continuation application of U.S. patent application Ser. No. 16/578,406, filed on 23 Sep. 2019, which is a continuation application of U.S. patent application Ser. No. 15/600,527, filed on 19 May 2017, which claims the benefit of U.S. Provisional Application No. 62/339,039, filed on 19 May 2016, each of which is incorporated in its entirety by this reference.

The Application is related to U.S. patent application Ser. No. 15/347,689, filed on 9 Nov. 2016, which is incorporated in its entirety by this reference.

TECHNICAL FIELD

This invention relates generally to the field of stock tracking and more specifically to a new and useful method for identifying stock in the field of stock tracking.

DESCRIPTION OF THE EMBODIMENTS

Figure 1:
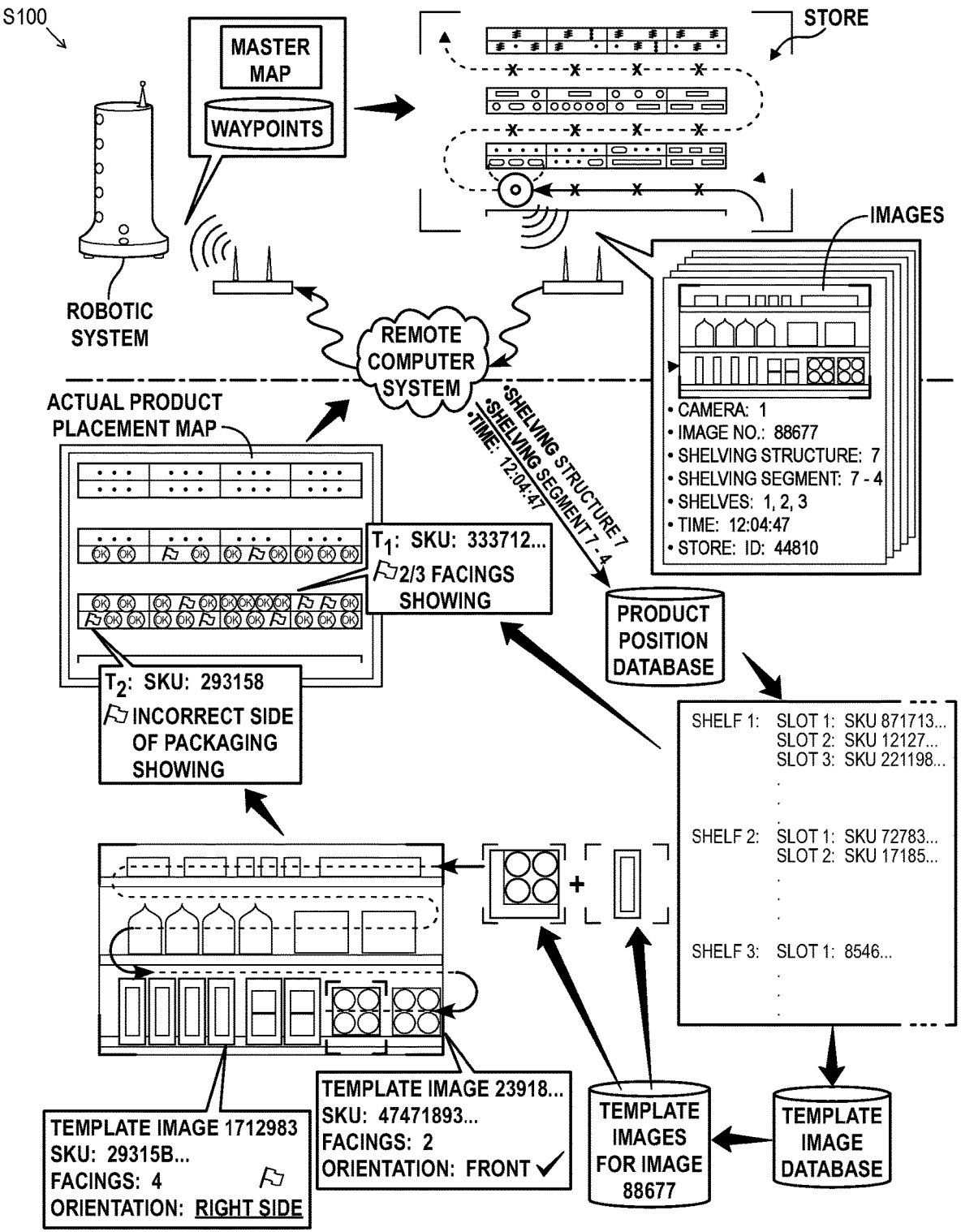
FIG. 1 is a flowchart representation of a method.
Figure 2:
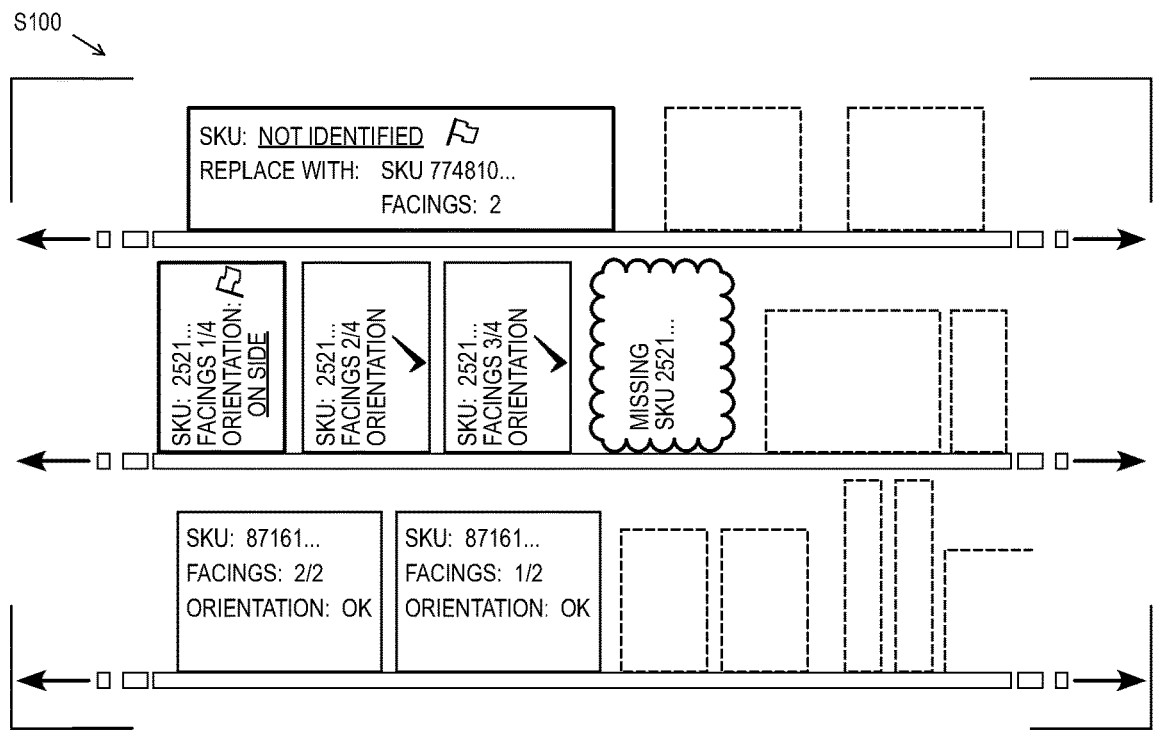
FIG. 2 is a graphical representation of one variation of the method.
Figure 3:
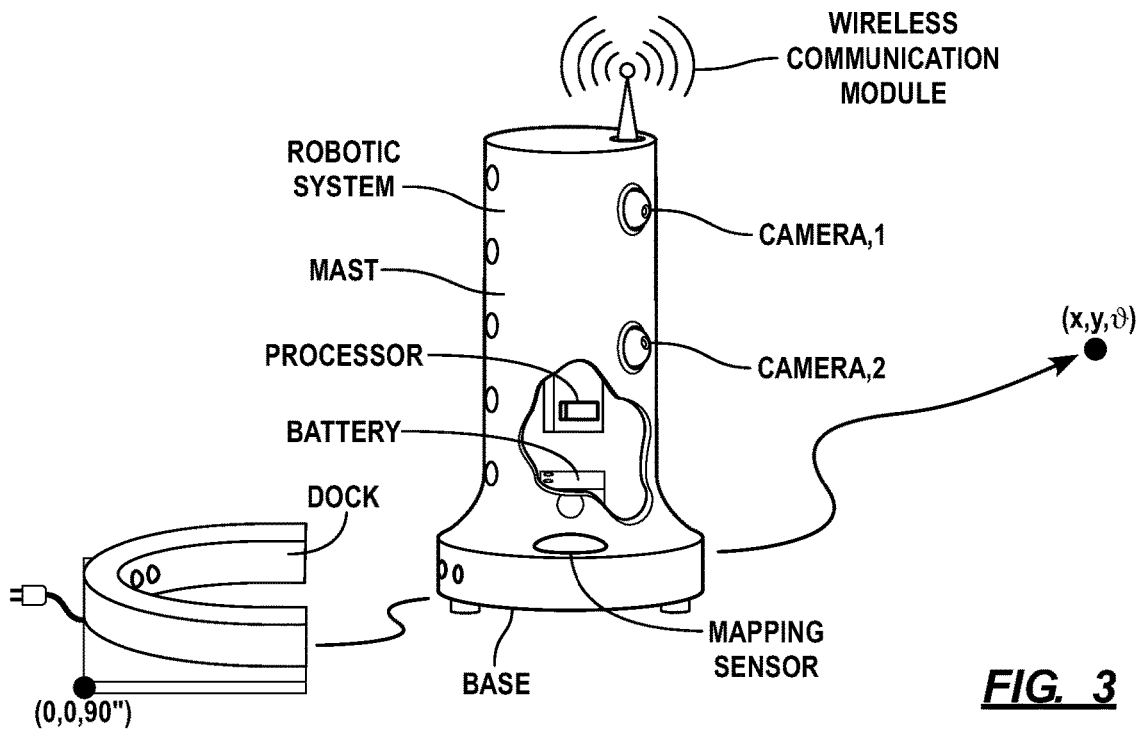
FIG. 3 is a flowchart representation of one variation of the method.
Figure 4:
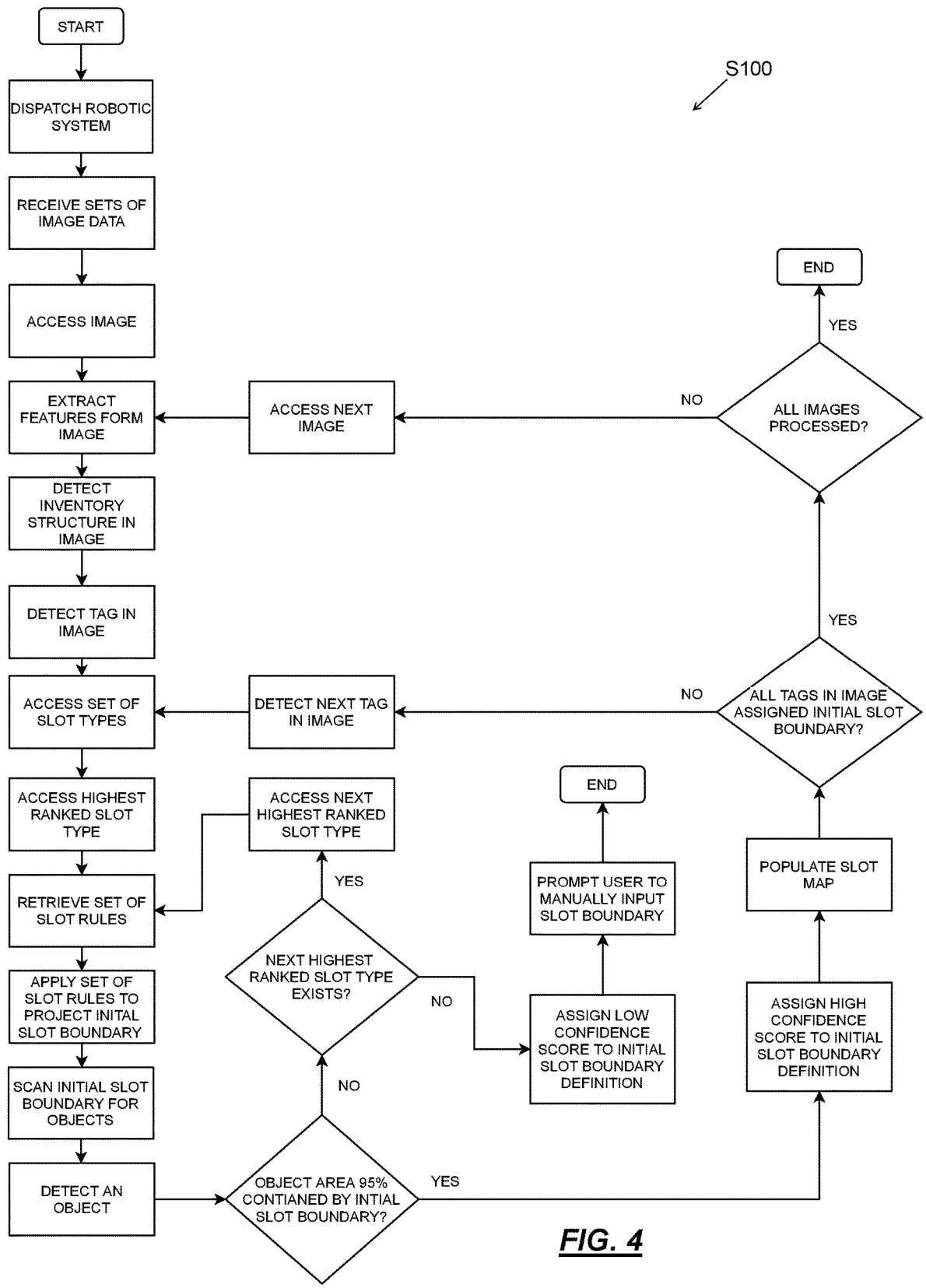
FIG. 4 is a flowchart representation of one variation of the method.
Figure 5:
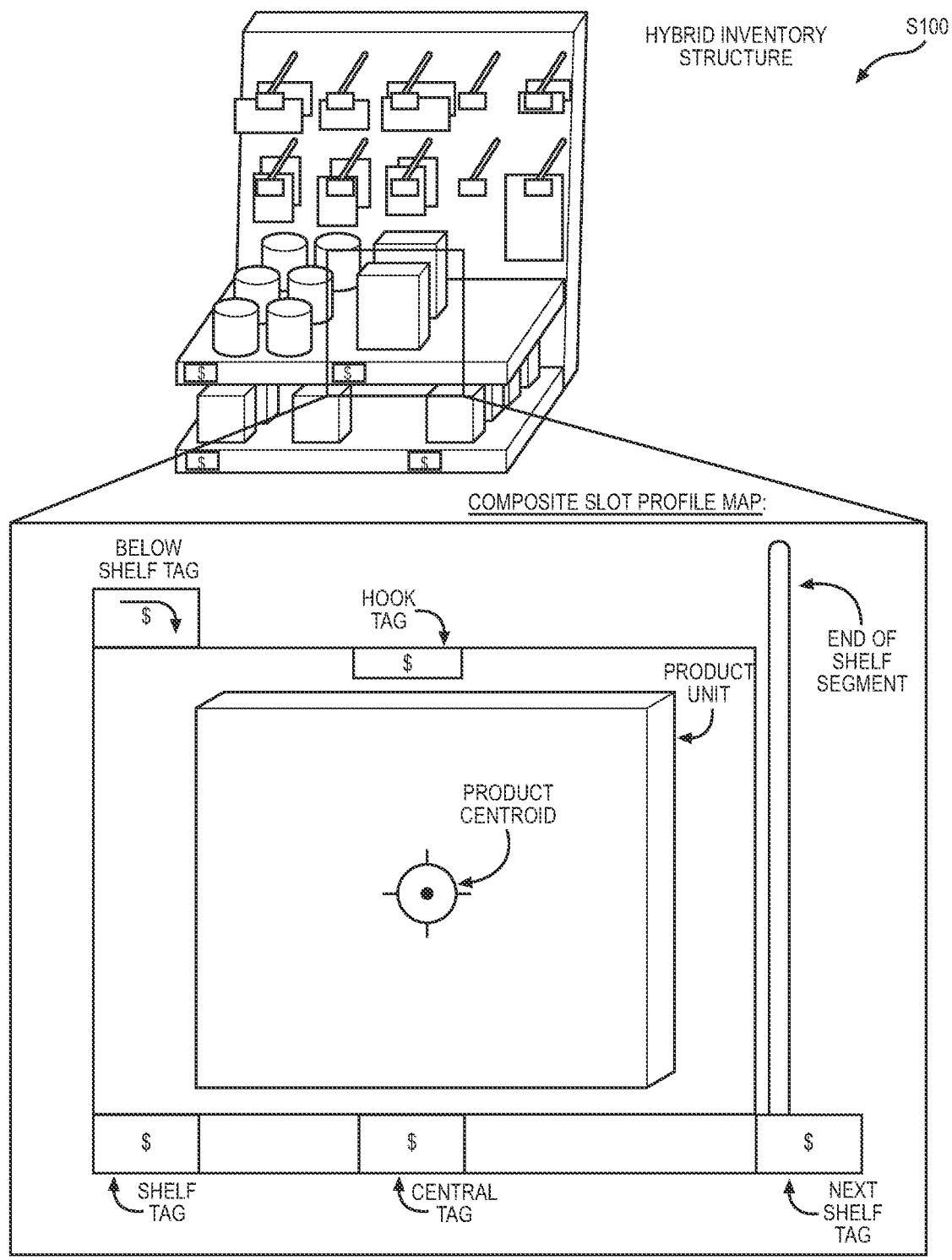
FIG. 5 is a graphical representation of one variation of the method.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

A method S100 for classifying product organization in an inventory structure can include a computer system: deploying a mobile robotic system in a store; dispatching the mobile robotic system to autonomously navigate through the store and record a set of images depicting inventory structures located within the store; accessing a first image in the set of images recorded by the mobile robotic system; detecting an inventory structure within the image; isolating a shelving structure within the image; detecting a first tag in the image; accessing a set of slot types; accessing a highest-ranked slot type; retrieving a first set of slot rules for the highest-ranked slot type; applying the first set of slot rules for nominal slot boundaries to the area proximal the first tag; defining a first initial slot boundary in the image; scanning the first initial slot boundary for objects; detecting an object within the first initial slot boundary; detecting that the object area is at least 95% contained within the first initial slot boundary; assigning a high confidence score to the first initial slot boundary definition; populating a slot map; repeating the foregoing process for all slot tags detected in the shelf segment; completing the slot map for the shelving segment; and repeating the foregoing process to complete the slot map for all other shelving segments in the store.

In one variation of the method S100 in which the computer system detects an object within the initial slot boundary, the area of the object detected in the slot is less than 95% contained within the initial slot boundary. In response, the computer system: assigns a low confidence score to the slot boundary definition; accesses a second ranked slot type; retrieves a second set of slot rules for the second ranked slot type; applies the second set of slot rules for nominal slot boundaries to the area proximal the first tag; defines a second initial slot boundary in the image; scans the second initial slot boundary for objects; detects an object within the initial slot boundary; detects that the object area is at least 95% contained within the second initial slot boundary; assigns a high confidence score to the second slot boundary definition; and populates the slot map.

In another variation of the method S100 in which the area of the object detected in an initial slot boundary is less than 95% contained within the initial slot boundary, the computer system assigns a low confidence score to the slot boundary definition and prompts a user to manually assign a slot type and/or boundary to the slot tag.

2. Applications

Generally, a computer system: accesses an image recorded by a mobile robotic system; extracts features depicting inventory structures, product units, and tags, etc., from the image; disambiguates types of slots—such as shelf slots and hanging or hook slots—based on these extracted features; and generates a slot map describing slots throughout the store. The computer system can then implement this slot map: to characterize inventory status within each slot boundary; to assemble these slot-specific inventory statuses into a total inventory status of the store; and to predict slot boundaries in images captured by the robotic system during subsequent scan cycles.

In particular, the computer system can execute the method S100 to generate a map of slot types throughout inventory structures within the store based on a limited set of rules for the store (hereinafter "slot types," such as positions of slot tags relative to shelf and hook slots) and an initial set of images of the inventory structures captured by the mobile robotic system (and/or or fixed cameras) deployed in the store.

To scan a shelving segment, the computer system: accesses an image; applies slot rules to the image to predict slot boundaries; detects an object (or set of objects) in the image; checks that the object is substantially (95%) within the slot boundaries; checks that the object matches the product type assigned to the slot; and populates a slot map with the location of the slot, slot type, and product type detected in the slot.

Therefore, the computer system can: detect the number of product facings per identified slot; identify that the correct product types are present within the boundaries of their assigned slot (e.g., that the shelf segment is well organized);

and detect when product slots have been changed (or drifted over time), by comparing a current slot map to a previous slot map; to compile a stock condition of the store; and serve the stock condition to a user such as a store manager.

When performing a scan, the computer system can reference a previous slot map (or a default slot map if the present scan is the first scan of a store) to retrieve a location of a slot based on product type. In the event that an expected slot tag is not detected at a location in the store, the computer system can access a previous slot map to retrieve a slot previously recorded in the slot map at the location. By accessing previous slot maps, the computer system can predict slot boundaries in shelving segments even if a tag is not detected (e.g. tag is obscured or missing), or information from the tag cannot be read. In the event a tag is not detected in a location in which the computer system expects to detect a tag based on a previous slot map, the computer system can notify a user to confirm a change to the shelving segment organization or confirm a missing or unreadable tag.

3. Mobile Robotic System

A mobile robotic system autonomously navigates throughout a store and records images—such as color (e.g., RGB) images of packaged goods and hyper-spectral images of fresh produce and other perishable goods—continuously or at discrete predefined waypoints throughout the store during a scan cycle. Generally, the mobile robotic system can define a network-enabled mobile robot that can autonomously: traverse a store; capture color and/or hyper-spectral images of inventory structures, shelves, produce displays, etc. within the store; and upload those images to the remote computer system for analysis, as described below.

In one implementation, the mobile robotic system defines an autonomous imaging vehicle including: a base; a drive system (e.g., a pair of two driven wheels and two swiveling castors) arranged in the base; a power supply (e.g., an electric battery); a set of mapping sensors (e.g., fore and aft scanning LIDAR systems); a processor that transforms data collected by the mapping sensors into two- or three-dimensional maps of a space around the mobile robotic system; a mast extending vertically from the base; a set of color cameras arranged on the mast; one or more hyper-spectral sensors (or "cameras," "imagers") arranged on the mast and configured to record hyper-spectral images representing intensities of electromagnetic radiation within and outside of the visible spectrum; and a wireless communication module that downloads waypoints and a master map of a store from a computer system (e.g., a remote server) and that uploads photographic images recorded by the camera and maps generated by the processor to the remote computer system. In this implementation, the mobile robotic system can include cameras and hyper-spectral sensors mounted statically to the mast, such as two vertically offset cameras and hyper-spectral sensors on a left side of the mast and two vertically offset cameras and hyper-spectral sensors on the right side of mast. The mobile robotic system can additionally or alternatively include articulable cameras and hyper-spectral sensors, such as: one camera and hyper-spectral sensor on the left side of the mast and supported by a first vertical scanning actuator; and one camera and hyper-spectral sensor on the right side of the mast and supported by a second vertical scanning actuator. The mobile robotic system can also include a zoom lens, a wide-angle lens, or any other type of lens on each camera and/or hyper-spectral sensor.

Furthermore, multiple mobile robotic systems can be deployed in a single store and can be configured to cooperate to image shelves within the store. For example, two mobile robotic systems can be placed in a large single-floor retail store and can cooperate to collect images of all shelves and produce displays in the store within a threshold period of time (e.g., within one hour). In another example, one mobile robotic system can be placed on each floor of a multi-floor store, and each mobile robotic system can collect images of shelves and produce displays on its corresponding floor. The remote computer system can then aggregate color and/or hyper-spectral images recorded by multiple mobile robotic systems placed in one store to generate a graph, map, table, and/or task list for managing distribution and maintenance of product throughout the store.

The method S100 is described herein as executed by the computer system in conjunction with a mobile robotic system deployed in the store. However, the computer system can additionally or alternatively access and process images captured by a set of fixed cameras in the store to derive a slot map defining types and boundaries of slots throughout the store.

4. Image Segmentation

Generally, the computer system identifies a shelving structure, a shelving segment within the shelving structure, a shelf within the shelving segment, an object arranged over the shelf (or arranged on another inventory structure apparatus, such as a hook or dispenser), a slot tag arranged on the shelf, and/or any other feature in an image received from the mobile robotic system. From these features, the computer system can identify both a product type of the object and its vertical and horizontal location on the shelving structure, which the computer system can then transform into a position within the slot relative to the slot tag, and thereby characterize the slot type depicted in the image.

4.1 Shelving Structure Segmentation

In one implementation, the system implements computer vision techniques to distinguish a shelving structure represented within an image (e.g., a panoramic image of a shelving structure containing multiple shelving segments.) The system can further distinguish a shelving segment—within the shelving structure—represented within the image by: scanning the area of interest in the image for (approximately) continuous vertical linear curves, and associates these vertical linear curves with vertical edges of shelving segments in the shelving structure represented in the area of interest in the image. The computer system can then: delineate a region between two adjacent vertical shelving segment edges—offset by a real distance approximating a known or common width of shelving segments in shelving structures—in the area of interest in the image; and label this region as representing a single shelving segment. The system can repeat this process for each other pair of adjacent vertical shelving segment edges detected in the image to segment the image into multiple discrete regions representing discrete shelving segments in the shelving structure.

Once the system detects a shelving segment in the image, the system can detect a set of features in the image corresponding to an array of slot tags present within the image. The computer system can isolate a single slot tag and further segment the image into a region corresponding to an area or volume proximal to, or within a threshold distance of, the slot tag, referred to as a slot, based on a set of slot rules corresponding to a particular slot type. The computer system accesses a set of slot types to retrieve a set of slot rules that prescribe a set of slot boundaries for a particular slot type.

The computer system can repeat this process for each shelving structure in the store. However, the computer system can implement any other method or technique to identify one or more shelving segments, tags, and slots within an image.

5. Object Detection

In one implementation, the computer system implements computer vision techniques, such as object detection or edge detection, to detect discrete objects (e.g., product units)—present on shelves in the shelving segment—in the image of the shelving segment.

For example, the computer system can implement edge detection and object recognition techniques—such as described in U.S. patent application Ser. No. 16/578,406—to detect discrete objects present on shelves in the shelving segment and to identify product types of these discrete objects.

6. Slot Types

In one implementation, the computer system retrieves a predefined slot type ranking which can be generic to all stores, specific to the chain of the store, or specific to a single store and defined by a store manager via a user portal hosted by the computer system.

In another implementation in which a planogram for the store is extant, the computer system can: access the planogram; extract a list of slot types and corresponding slot type quantities identified in the planogram; and rank slot types in the list of slot types by quantity (or "frequency").

As described below, the computer system can then access an image of a shelving segment; detect slot tags in the image; and initialize slot boundary predictions for the shelving segment based on locations of these slot tags and the highest-ranking slot type—in the ranked list of slot types—for the store.

The computer system can then selectively modify an initial slot boundary prediction for a particular slot in the shelving segment—based on a next-highest-ranking slot type—responsive to low confidence that distribution of objects in the particular slot correspond to the initial slot boundary prediction.

The computer system can repeat this process, as described below, to modify the slot boundary prediction for the particular slot until the computer system matches the distribution of objects in the particular slot to the slot boundary prediction prescribed by a slot type in the ranked list.

7. Slot Rules

Generally, the system can retrieve a set of slot rules, each prescribing a slot boundaries for a particular slot type based on features on a shelving structure, such a slot tags and edges of shelf faces.

For example, a shelf-type slot rule can specify: a left edge of a slot boundary aligned with a left edge of a slot tag; a bottom edge of the slot boundary aligned with a top edge of a shelf occupied by the slot tag; a top edge of the slot boundary aligned with a bottom edge of a next shelf above the slot tag; and a right edge of the slot boundary aligned with a left edge of a next slot tag to the right of the slot tag.

In another example, a hook-type slot rule can specify: a top edge of a slot boundary aligned with the top edge of a slot tag; a bottom edge of the slot boundary aligned with the closer of a top edge of a shelf face below the slot tag or the top edge of a next slot tag below the slot tag; a vertical centerline of the slot boundary centered on the slot tag; a left edge of the slot boundary (approximately) centered between the slot tag and a next slot tag to the left of the slot tag; and/or a right edge of the slot boundary (approximately) centered between the slot tag and a next slot tag to the right of the slot tag.

8. Slot Boundaries

The computer system then: retrieves a target slot rule for a highest-ranked slot type for the store; and defines (or "projects") slot boundaries onto the image of the shelving segment based on the target slot rule and positions of slot tag, shelf face, and/or other features detected in the image. Alternatively, the computer system can: project locations of objects (e.g., product units), slot tags, shelf faces, etc. onto a virtual shelving segment map; and define slot boundaries in the virtual shelving segment map based on the target slot rule and positions of slot tag, shelf face, and/or other features detected in the image.

In one implementation, the computer system detects an array of tags in an image of a shelving structure; selects a first tag (e.g., a bottom-leftmost tag in the shelving segment); retrieves a first slot rule corresponding to the highest rank slot type (e.g. a shelf slot); and implements the first slot rule to project a first, initial slot boundary proximal the first tag onto the image (or to define this first, initial slot boundary in a virtual shelving segment map). The computer system can thus leverage features detected in the image of the shelving segment and the highest-ranked slot type rule to generate an initial prediction for a slot boundary of a first slot that corresponds to the first slot tag present on the shelving segment.

The computer system then scans the area of the image that falls within the first, initial slot boundary for objects. The computer system can then: characterize a proportion (or a "fullness") of the first, initial slot boundary filled by discrete objects of the same type (e.g., the same product type); characterize a proportion of the first, initial slot boundary filled by discrete objects of different types (e.g., different product types); and/or characterize a proportion of the face of each discrete object that intersects the first, initial slot boundary; etc. The computer system can then predict accuracy of the first slot type in describing the first slot—corresponding to the first slot tag—on the first shelving segment based on these characteristics. In response to predicting low accuracy of the first slot type in describing the first slot, the computer system can: select a next-highest ranking slot type from the list; retrieve a slot type rule for this slot type; and repeat the first foregoing process based on this next slot type rule until the computer system predicts greater or sufficient accuracy of a particular slot type in describing the first slot on the shelving segment. The computer system can then label a slot map for the shelving segment: with the final slot boundary derived for the first slot; the slot type of the first slot; a primary (e.g., highest-frequency) product type detected within the slot boundary; and/or a position or and/or product type read from the first tag. The computer system can then repeat this process for each other slot tag detected in the image of the shelving segment.

8.1 Slot Boundaries Check: Single Object Present

For example, the computer system can: detect an array of tags depicted in an image of the shelving structure; select a first tag in an image of an inventory structure, the first tag located in the topmost and leftmost position in the image; access an ordered set of slot types to retrieve a first, highest-ranked slot type; retrieve the set of slot rules corresponding to the highest-ranked slot type; initialize a first, initial slot boundary for a first tag detected in the image of the shelving segment based on the set of slot rules for the first slot type; and project the first, initial slot boundary onto the image.

The computer system can then scan the region of the image contained within the first, initial slot boundary for objects. If the computer system detects a single object within the first, initial slot boundary of the first slot, the computer system can predict accuracy of the first slot type in describing the first slot if: a width and a visible area of the detected object; the width of the object is between minimum and maximum threshold proportions (e.g., 80% and 95%) of the width of the first slot; and/or at least 95% of the width of the object falls within the initial slot boundary of the first slot. (The computer system can further: identify a proximal tibial of the object; read a product type identifier from the first slot tag; and validate the first slot type for the first slot if these product types agree.) The computer system can then access a slot map of the shelving segment or the store more generally and populate the slot map with: an address or location of the tag; a width, height, and position of the slot boundary, such as relative to the shelving segment, relative to the first tag, and/or relative to a coordinate system of the store; and the first slot type. The computer system can then repeat the foregoing process for the remaining tags detected in the image of the shelving segment.

However, the computer system can predict that the first, initial slot boundary is incorrect for the slot tag: if the width of the single object is less than the minimum threshold proportion of the width of the first, initial slot boundary; if less than the total proportion of the object is contained within the first, initial slot boundary; or if the object is wider than the maximum threshold proportion of the width of the first, initial slot boundary (i.e., too large for the first slot). Accordingly, the computer system can then: retrieves a second slot type (such as describing a hook slot); and repeat the foregoing process to validate a new boundary prediction for the first slot based on this second slot type.

8.2 Slot Boundaries Check: Single Object Present

Alternatively, if the computer system detects multiple objects within the first, initial slot boundary linked to the first slot tag, the computer system can predict accuracy of the first slot type in describing the first slot if: all of the objects are of the same product type; the aggregate width of the set of objects is at least a threshold proportion (e.g., 60%) of the width of the first, initial slot boundary; and at least a threshold proportion (e.g., 95%) of the faces these objects fall within the first, initial slot boundary. Accordingly, the computer system can then: estimate a target or maximum number of facings of the product type for the first slot by dividing the width of the first, initial slot boundary by the width of a single object in this set of objects. The computer system can then access a slot map of the shelving segment or the store more generally and populate the slot map with: an address or location of the tag; a width, height, and position of the slot boundary, such as relative to the shelving segment, relative to the first tag, and/or relative to a coordinate system of the store; the slot type; and the target the number of facings. The computer system can then repeat the foregoing process for the remaining tags detected in the image of the shelving segment.

However, the computer system can predict that the first slot type fails to accurately described a first slot associated with the first slot tag: if the set of objects located within the first, initial slot boundary represent different object types; all product units are not of the same product type); if the edges of the first, initial slot boundary intersect objects in this set near their vertical centerlines; or if the product type of objects detected within the first, initial slot boundary differs from a product type identifier read from the first slot tag. Accordingly, the computer system can then: retrieves a second slot type (such as describing a hook slot); and repeat the foregoing process to validate a new boundary prediction for the first slot based on this second slot type.

8.3 Other Slots

The computer system can repeat the foregoing process for all other tags detected in the image of the shelving segment and compile corresponding results into a slot map for the shelving segment. Further, the computer system can repeat this process for each other shelving segment detected in images captured by the mobile robotic system and/or fixed cameras deployed in the store.

9. Slot Map

The computer system accesses a slot map of the store (e.g., a 2D map of shelving structures or a 3D map of inventory structures within the store) that includes the location of structures, shelving segments, to populate the slot map with the slot boundaries and slot type applied to a detected slot tag in the preceding steps to produce a slot map with slot boundaries labeled with slot types; each slot in the slot map associated to an address that describes the location, inventory structure, shelf segment, shelf (or hook, bin), and position of the slot on the shelf within the shelf segment at which the slot is located.

In one implementation, once the slot map is complete, the computer system can access the slot map to derive a number of product facings. In one example, the computer system derives a number of facings by accessing the slot map, retrieving the set of slot boundaries, retrieving a set of dimensions (e.g., width and height) of an object (e.g., a product unit) detected within the slot, and dividing the width of the slot (e.g., as defined by the distance between the left and right boundaries of the slot) by the width of the detected object, to derive a number of product facings. The computer system can then derive the stock level of a particular slot based on the number of facings within the boundary, and the number of objects detected within the boundary.

In another implementation, the computer system can derive the stock level of a particular slot based on the proportion of the area of the slot boundary occupied by products that belong in that slot based on a planogram of the store.

In another implementation, the computer system can store historical slot maps and compare slot maps over time. For example, the computer system can: access a first slot map completed at a first time; access a second slot map completed at a second time; identify a set of differences between the first slot map and the second slot map; and prompt a user (e.g., a store manager) via a user portal, to confirm the set of differences as approved changes within the store.

In another example, the computer system can identify the set of differences detected between a first slot map and a second slot map as slot drift by: detecting a first set of slot tags in a first shelving segment in a first slot map arranged in a first slot tag order and in a first set of positions; detecting the first set of slot tags in the first shelving segment in a second slot map arranged in a second slot tag order in a second set of positions; identifying that the first set of positions is not equal to the second set of positions within a threshold value; flagging the first shelving segment in the second slot map as displaying slot drift; and prompting a user (e.g., a store manager) via a user portal, to correct the slot drift at the first shelving segment.

The computer system maintains historical slot maps compiled from previous scans of the store. Therefore, the computer system can access a previous slot map to predict the locations, types, and boundaries of slots in a store, and the product types and number of product facings present in those slots while completing a scan of the store. The computer system can access these historical slot maps to retrieve data regarding a particular slot in the event that an in-progress scan produces anomalous results, such as a missing slot tag. The computer system can access the previous slot map and compare the in-progress scan data regarding a particular slot to past scan data regarding the particular slot. The computer system can either correct the in-progress scan data, such as by inserting an artificial or virtual tag at the previously-recorded boundary, or can notify a user, via a user portal, of the discrepancy and prompt the user to manually verify the slot boundary.

10. Variation

Figure 6:
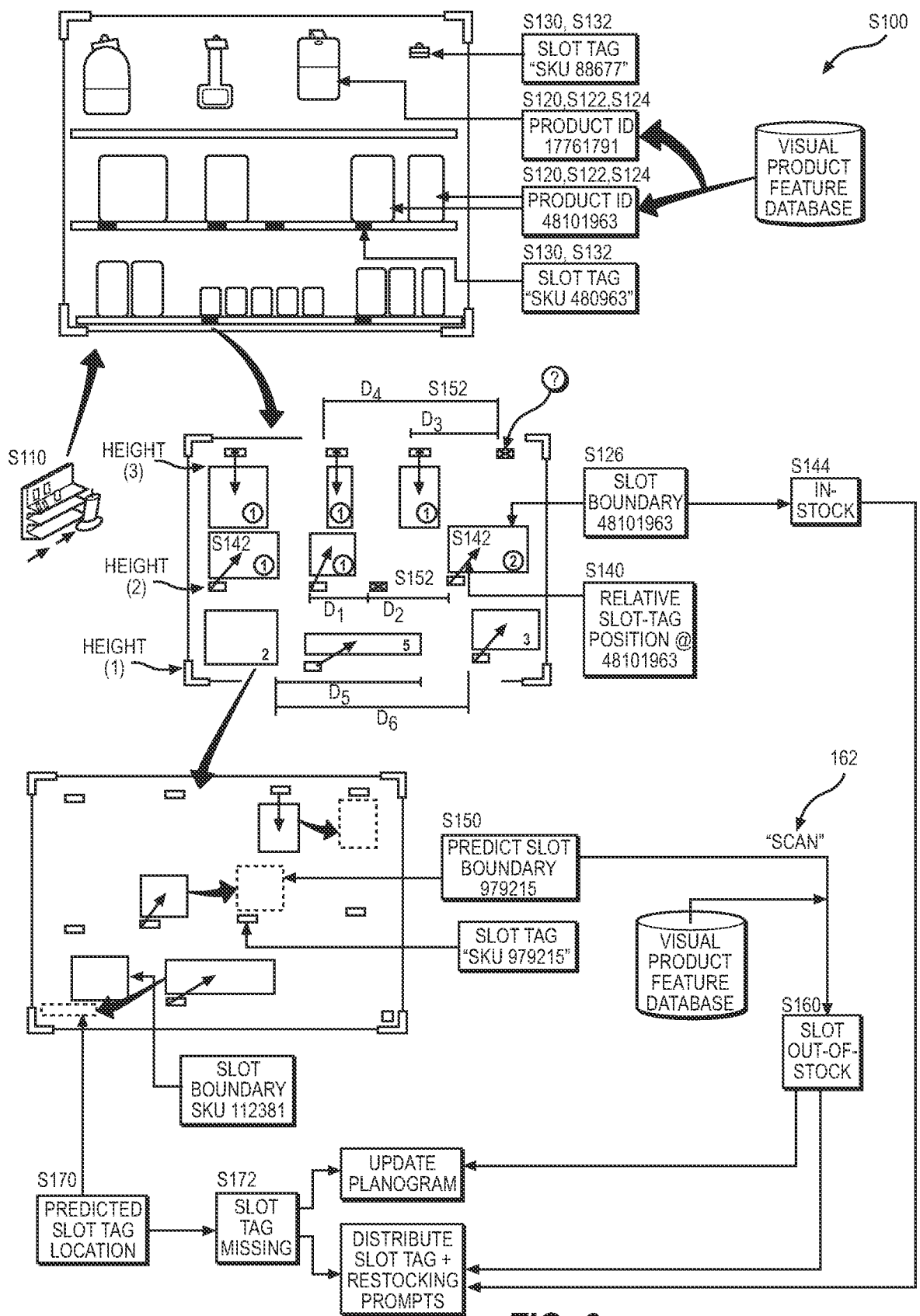
FIG. 6 is a flowchart representation of one variation of the method.

In one variation shown in FIG. 6, the method S100 includes: accessing a first image depicting an inventory structure in a store at a first time in Block S110; detecting a first product unit in the first image in Block S120; extracting a first set of features, depicting the first product unit, from the first image in Block S122; identifying the first product unit as a first product type based on the first set of features in Block S124; locating a first slot boundary, containing the first product unit, in the first image in Block S126; detecting a first slot tag in the first image in Block S130; and extracting a first product identifier, from the first slot tag, depicted in the first image in Block S132. The method S100 also includes, in response to the first product identifier corresponding to the first product type: associating the first slot boundary with the first slot tag in Block S140; extracting a first relative tag-boundary position of the first slot boundary and the first slot tag from the first image in Block S142; and identifying the first slot boundary as in-stock at the first time in Block S144. The method S100 further includes: detecting a second slot tag in the first image in Block S130; extracting a second product identifier, from the second slot tag, depicted in the first image in Block S132; predicting a second slot boundary, assigned to a second product type corresponding to the second product identifier, in the first image based on a second position of the second tag in the first image and the first relative tag-boundary position in Block S150; scanning the first image for a second product unit corresponding to the second product identifier in Block S162; and, in response to absence of the second product unit corresponding to the second product identifier within the second slot boundary in the first image, identifying the second slot boundary as out-of-stock at the first time in Block S160.

In this variation, the method S100 can similarly include: accessing a first image depicting an inventory structure in a store at a first time in Block S110; detecting a first product unit in the first image in Block S120; extracting a first set of features, depicting the first product unit, from the first image in Block S122; identifying the first product unit as a first product type based on the first set of features in Block S124; locating a first slot boundary, containing the first product unit, in the first image in Block S126; detecting a first slot tag in the first image in Block S130; and extracting a first product identifier, from the first slot tag, depicted in the first image in Block S132. This variation of the method S100 can also include, in response to the first product identifier corresponding to the first product type: associating the first slot boundary with the first slot tag in Block S140; and extracting a first relative tag-boundary position of the first slot boundary and the first slot tag from the first image in Block S142. This variation of the method S100 can further include: detecting a second product unit in the first image in Block S120; extracting a second set of features, depicting the second product unit, from the first image in Block S122; identifying the second product unit as a second product type based on the second set of features in Block S124; locating a second slot boundary, containing the second product unit, in the first image in Block S126; detecting a second slot tag in the first image in Block S130; extracting a second product identifier, from the second slot tag, depicted in the first image in Block S132; in response to the second product identifier corresponding to the second product type, associating the second slot boundary with the second slot tag in Block S134; detecting a third slot tag in the first image in Block S130; extracting a third product identifier, from the third slot tag, depicted in the first image in Block S132; characterizing a first distance between the first slot tag and the second slot tag in Block S152; and characterizing a second distance between the second slot tag and the third slot tag in Block S152. This variation of the method S100 can also include, in response to absence of a third product unit corresponding to the third product identifier within the third slot boundary in the first image and in response to the second distance exceeding the first distance, predicting a third slot boundary, assigned to a third product type corresponding to the third product identifier, in the first image in Block S150 based on: a third position of the third tag in the first image; and the first relative tag-boundary position.

In this variation, the method S100 can alternatively include: accessing a first image depicting an inventory structure in a store at a first time in Block S110; detecting a first product unit in the first image in Block S120; extracting a first set of features, depicting the first product unit, from the first image in Block S122; identifying the first product unit as a first product type based on the first set of features in Block S124; locating a first slot boundary, containing the first product unit, in the first image in Block S126; detecting a first slot tag in the first image in Block S130; and extracting a first product identifier, from the first slot tag, depicted in the first image in Block S132. This variation of the method S100 can also include, in response to the first product identifier corresponding to the first product type: associating the first slot boundary with the first slot tag in Block S140; extracting a first relative tag-boundary position of the first slot boundary and the first slot tag from the first image in Block S142; and identifying the first slot boundary as in-stock at the first time in Block S144. This variation of the method S100 can further include: detecting a second product unit in the first image in Block S120; extracting a second set of features, depicting the second product unit, from the first image in Block S122; identifying the second product unit as a second product type based on the second set of features in Block S124; locating a second slot boundary, containing the second product unit, in the first image in Block S126; predicting a second location of a second slot tag, corresponding to the second slot boundary, in the first image based on a second position of the second slot boundary in the first image and the first relative tag-boundary position in Block S110; and, in response to detecting absence of the second slot tag in the second location in the first image, flagging the second slot boundary as missing the second slot tag in Block S172.

10.1 Applications

Generally, in this variation, the computer system: accesses an image of an inventory structure; scans the images for both slot tags and product units; and reads (e.g., via optical character recognition) product identifiers (e.g., SKU values) from these slot tags detected in the image. The computer system also separately identifies product types of product units detected in the image (e.g., by implementing methods and techniques described in U.S. patent application Ser. No. 17/727,044 to match visual features of these product units to template visual features of known product types assigned to the inventory structure or in a product category associated with the inventory structure). The computer system then: defines slot boundaries around clusters of product units of the same product types; links slot tags to slot boundaries based on correspondence between product identifiers read from these tags and product types of product units contained within these slot boundaries.

The computer system thus pair slots assigned to product units of identifiable product types to corresponding slot tags depicting readable product identifiers. The computer system can then implement methods and techniques described in U.S. patent application Ser. No. 17/727,044: to count product facings in these slots; to interpret understock or fully-stocked conditions in these slots based on product unit and/or facing count specified on these slot tags (or in a planogram of the store) and counts of product units detected within these slot boundaries.

However, for an empty (i.e., out-of-stock) slot on the inventory structure containing no product units that define a boundary of the slot, the computer system can execute Blocks of the method S100: to predict a slot boundary for the slot; to link this predicted slot boundary to a slot tag; and detect an out-of-stock condition of the slot. In particular, in response to failure to detect a product unit of a product type corresponding to particular product identifier read from a particular slot tag in the image, the computer system can characterize relative positions of slot boundaries and corresponding slot tags (hereinafter "relative tag-boundary positions") detected in the image and select a particular relative tag-boundary position likely to correspond to the particular slot tag, such as: a relative tag-boundary position of a nearest boundary-tag pair; a relative tag-boundary position of a boundary-tag pair in the same horizontal position as and to the left of the particular slot tag; or a most-common relative tag-boundary position detected in the inventory structure. The computer system then: calculates a predicted slot boundary for the particular slot tag based on a position of the particular slot tag in the image and the particular relative tag-boundary position; and scans a region of the image within the predicted slot boundary for product units. In response to detecting absence of product units in this region of the image, the computer system can: confirm association between the slot boundary and the slot tag; and flag the slot as out-of-stock. Alternatively, in response to detecting a product unit—in this region of the image—of a product type different from the product identifier read from the particular slot tag and not corresponding to other slot tags detected in the image, the computer system can flag the slot as out-of-stock and occupied by an incorrect product type. Yet alternatively, in response to detecting a product unit—in this region of the image—of a product type different from the product identifier read from the particular slot tag and/or in response to the projected slot boundary intersecting another slot boundary defined around another cluster of product units, the computer system can: select an alternative relative tag-boundary position; and repeat the foregoing process to redefine the slot boundary for the particular slot tag.

The computer system can therefore leverage relative positions of verified boundary-tag pairs to predict a slot boundary of an empty slot in the inventory structure based on a position of a corresponding slot tag. The computer system can implement similar methods and techniques to predict a slot boundary of a slot visually-obstructed in the image, such as by a patron of the store or a freestanding cardboard display.

Similarly, for a missing, damaged, or visually-obstructed slot tag (e.g., due to glare in the image), the computer system can execute Blocks of the method S100: to predict a location of a slot tag; to link this predicted slot tag location to a corresponding slot boundary containing a set of product units of a corresponding product type; and generate a prompt to replace or repair the slot tag accordingly. In particular, in response to failure to detect a slot tag containing a product identifier corresponding to a particular product type of a product unit detected in the image, the computer system can implement methods and techniques described above: to define a slot boundary around the product unit (or a cluster of adjacent product units of the particular product type); to characterize relative positions of slot boundaries and corresponding slot tags detected in the image; and to select a particular relative tag-boundary position likely to correspond to the particular slot boundary. The computer system then: calculates a likely location of a slot tag corresponding to the slot boundary based on a position of the particular slot boundary in the image and the particular relative tag-boundary position; and scans the likely location in the image for a slot tag. In response to detecting absence of a slot tag in this region of the image, the computer system can: generate a prompt to install a slot tag for the slot on the inventory structure; and serve this prompt to an associate of the store. Alternatively, in response to detecting remnants of a slot tag in this region of the image, the computer system can: generate a prompt to replace a slot tag for the slot on the inventory structure; and serve this prompt to an associate of the store. Yet alternatively, in response to detecting glare in this region of the image, the computer system can: mute notifications related to this slot tag.

The computer system can therefore leverage relative positions of verified boundary-tag pairs to predict a location of a missing or damaged slot tag on the inventory structure based on a position of a product unit (or cluster of product units) of a corresponding product type.

This variation is described herein as executed by the computer system to process a single image of an inventory structure. However, the computer system can execute Blocks of the method S100 to process images depicting many or all inventory structures within the store.

10.2 Image Acquisition

Block S110 of the method S100 S100 recites accessing a first image depicting an inventory structure in a store at a first time.

In one implementation, a fixed camera unit arranged on and/or facing the inventory structure can capture an image (e.g., a color photographic image) of a segment of the inventory structure, such as: on a fixed interval (e.g., once per ten minutes); in response to absence of motion in the field of view of the camera unit following a period of motion in the field of view of the camera unit; and/or at predefined times (e.g., after scheduled restocking periods in the store). The camera unit can upload an image to the computer system, such as in real-time or during scheduled upload periods.

Upon receipt of an image in Block S110, the computer system can cache or store the image for immediate or delayed processing to: detect slots—associated with particular suppliers—in the image; characterize stock conditions of these slots; selectively mask (or "redact") regions of the image depicting slots based on a query received from a supplier (e.g., a distributor, a manufacturer) of a product type assigned to other slots depicted in the image; and distribute this masked image to the supplier responsive to the query. More specifically, in Block S110, the computer system can: access a photographic image captured by a fixed camera arranged within the store and facing the inventory structure.

In one variation, a set of camera units with overlapping fields of view are arranged in the store facing a length of (e.g., all shelving segments in) the inventory structures. In this variation, the camera units can be synchronized and configured to capture sets of concurrent images. Accordingly, in Block S110, the computer system can: access a set of concurrent images captured by these camera units; and compile this set of images into a composite image depicting this length (e.g., all of the shelving segments) of the inventory structure. The computer system can then process this composite image, as described below.

In another implementation, the computer system: deploys a robotic system—including an optical sensor—to autonomously navigate throughout the store during a scan cycle; and accesses an image captured by the robotic system while traversing an aisle facing the inventory structure in Block S110. In particular, in this variation, the computer system can implement methods and techniques described in U.S. patent application Ser. No. 15/600,527 to deploy a mobile robotic system to autonomously navigate throughout the store during a scan cycle, to capture images of inventory structures throughout the store during the scan cycle, and to offload these images to the computer system. The computer system can then access and process these images as described below.

The computer system can also implement methods and techniques described above to: access a sequence of photographic images captured by the robotic system during the scan cycle while traversing an aisle facing the inventory structure; and compile this sequence of photographic images into the first image defining a composite photographic image depicting a set of shelving segments spanning the first inventory structure. For example, in this implementation, the computer system can: deploy the mobile robotic system to autonomously navigate throughout the store during a scan cycle; access a sequence of photographic images captured by the robotic system during the scan cycle while traversing an aisle facing the inventory structure; and compile the sequence of photographic images into an image—of the inventory structure—defining a composite photographic image depicting a set of shelving segments spanning the inventory structure.

However, the computer system can implement any other methods or techniques to access images captured by a fixed camera unit and/or mobile robotic system deployed in the store.

10.3 Product Unit Detection and Identification

Block S120, S122, and S124 of the method S100 recite: detecting a product unit in the image; extracting a set of features, depicting the product unit, from the image; and identifying the product unit as a product type based on the set of features. Generally, in Blocks S120, S122, and S124, the computer system can implement methods and techniques described in U.S. patent application Ser. No. 17/727,044 to: detect an object in the image; extract visual features defining the object from the image; and identify a product type of the object based on these visual features, such as by a) reading a product identifier directly from the object, b) matching a color histogram of the object to a stored template color histogram of the known product type, c) matching a shape of the object to a stored template geometry of the known product type, and/or d) matching iconography on the object to stored template icons on the known product type, etc.

In one implementation, the computer system: detects an object in image; and extracts a set of features—including color values and text strings—from a region of the image depicting the object. The computer system then: retrieves a set of visual feature templates representing a set of product types in a product category associated with the inventory structure; scans the set of visual feature templates for features matching color values and text strings in the set of features; and identifies the object as product unit of a particular product type in response to the set of features approximating a visual feature template associated with the particular product type.

However, the computer system can implement any other method or technique to identify a product type of an object detected in the image of the inventory structure in Block S120, S122, and S124. Furthermore, the computer system can implement this process for each individual object detected in the image.

10.4 Slot Boundary by Product Unit Cluster

Block S126 of the method S100 recites locating a slot boundary, containing the product unit, in the image. Generally, in Block S126, the computer system can: detect a contiguous cluster of product units of the same product type (i.e., one or more adjacent product units of the same product type and not separated by a product unit of a different product type); and define a rectilinear (e.g., rectangular) slot boundary that fully contains this contiguous cluster of product units.

In one variation, the computer system further implements methods and techniques described in U.S. patent application Ser. No. 17/727,044 to detect a set of shelf faces in the image. In response to detecting a shelf face immediately below and abutting the contiguous cluster of list product units, the computer system locates (or "snaps") a bottom edge of the slot boundary to a top edge of the shelf face. Similarly, in response to detecting a shelf face immediately above the contiguous cluster of list product units, the computer system locates a top edge of the slot boundary along a bottom edge of this shelf face.

However, the computer system can implement any other method or technique to define a slot boundary around a cluster of like product units. The computer system can repeat this process for each other cluster of (i.e., one or more) like product units detected in the image.

10.5 Slot Tag Detection and Identification

Block S130 of the method S100 recites detecting a slot tag in the image; and Block S132 of the method S100 recites extracting a product identifier, from the slot tag, depicted in the image. Generally, in Blocks S130 and S132, the computer system can implement methods and techniques described in U.S. patent application Ser. No. 17/727,044 to: detect a slot tag in the image, such via template matching or object (re-)recognition; and reads a product identifier (e.g., an alphanumeric SKU value) from the tag, such as via optical character recognition.

The computer system can implement this process to detect a constellation of slot tags depicting in the image and to read product identifiers from these slot tags.

10.6 Relative Tag-Boundary Position

Blocks S140 and S142 recite, in response to the first product identifier corresponding to the first product type: associating the first slot boundary with the first slot tag; and extracting a first relative tag-boundary position of the first slot boundary and the first slot tag from the first image.

Generally, the computer system can match a) a product type of a cluster of like product units detected in the image and contained in a single slot boundary defined in Block S126 to b) a product identifier read from a slot tag detected in the image in Block S132, such as based on correspondence of the product type and product identifier (e.g., both alphanumeric SKU values) and in response to the slot boundary falling within a threshold distance of or abutting the slot tag. Accordingly, in Block S140, the computer system can pair (or "link," "associate") the slot boundary containing these product units with the corresponding slot tag and product identifier.

Upon deriving correspondence between the slot boundary and the slot tag, the computer system can extract a relative position of the slot boundary and the slot tag, such as: arrangement of the slot tag below and proximal a bottom-left corner of a slot boundary for a shelf-type slot; or arrangement of the slot tag above and proximal a top-center of a slot boundary for a hang-type slot.

The computer system can repeat this process to derive a relative tag-boundary position from each other paired slot boundary and slot tag detected in the image.

10.7 Slot Tag Detected: Relative Tag-Boundary Mapping

Block S150 of recites predicting a second slot boundary, assigned to a second product type corresponding to the second product identifier, in the first image based on a second position of the second tag in the first image and the first relative tag-boundary position. Generally, in Block S150, in response to failing to detect a product type— and thus failing to define a slot boundary—of a product type matched to a product identifier read from a particular slot tag, the computer system can leverage relative tag-boundary positions—derived from other slot boundary and slot tag pairs detected in the image—to predict a slot boundary corresponding to the particular slot tag.

10.7.1 Relative Tag-Boundary Selection

In one implementation, the computer system implements methods and techniques described above to detect a constellation of slot tags in the image and to read product identifiers from these slot tags, such as including a first product identifier from a first slot tag, a second product identifier from a second slot tag, and a third product identifier from a third slot tag. Then, in response to failure to match the third product identifier to a product unit detected in the image, the computer system calculates distances between the third slot tag and other slot tags detected in the image, including: a first distance between the first slot tag and the third slot tag; and a second distance between the second slot tag and the third slot tag. Then, in response to the first slot tag falling nearest the third slot tag (e.g., in response to the second distance exceeding the first distance), the computer system predicts correspondence of slot format between the first slot tag and the third slot tag. Accordingly, the computer system: retrieves a first relative tag-boundary position—derived from image—for the first slot tag; and predicts a third slot boundary for the third slot tag based on a third position of the third tag in the first image and the first relative tag-boundary position. For example, the computer system can: define an origin of the first slot boundary at a centroid of the first slot tag; store a position and orientation of the first slot boundary relative to the origin in the first relative tag-boundary position; calculate a centroid of the third slot tag in the image; and project the first slot boundary onto the image, with the origin of the first slot boundary located over the centroid of the third slot tag, to define the third slot boundary in the image.

In the foregoing implementation, the computer system can also characterize vertical positions of slot tags in the image, such as including: a first height of the first slot tag in the image; a second height of the second slot tag in the image; a third height of the third slot tag in the image; and a fourth height of a fourth slot tag in the image. The computer system then: associates the first slot tag, the second slot tag, and the third slot tag with a first slot row in the inventory structure based on correspondence between (e.g., similarity of) the first height, the second height, and the third height; and associates the fourth slot tag with a second slot row in the inventory structure based on the fourth height. The computer system then predicts correspondence of slot format between the first slot tag and the second slot tag: based on association of the first slot tag and the second slot tag with the same slot row in the inventory structure; and in response to proximity of first slot tag and the second slot tag.

10.7.2 Shelf Tag

In one example, the computer system: locates a first rectilinear slot boundary—around a first cluster of product units corresponding to a first product type—in the first image; associates this first slot boundary with a first slot tag specifying a corresponding product type; and derives a first relative tag-boundary position that defines a shelf tag location adjacent and below a first lower-left corner of the first rectilinear slot boundary based on positions of the first rectilinear slot boundary and the first slot tag in the first image. Accordingly, in response to detecting a second slot tag adjacent the slot tag and specifying a product identifier of a product type not detected in the image, the computer system can: define a second rectilinear slot boundary analogous (e.g., of a size and geometry similar) to the first rectilinear slot boundary; and locate a lower-left corner of the second slot boundary adjacent and above the second slot tag in the first image according to the first relative tag-boundary position.

10.7.3 Hang Tag

In another example, the computer system: locates a first rectilinear slot boundary—around a first cluster of product units corresponding to a first product type—in the first image; associates this first slot boundary with a first slot tag specifying a corresponding product type; and derives a first relative tag-boundary position that defines a hang tag location adjacent and centered above the first rectilinear slot boundary based on positions of the first rectilinear slot boundary and the first slot tag in the first image. Accordingly, in response to detecting a second slot tag adjacent the slot tag and specifying a product identifier of a product type not detected in the image, the computer system can: define a second rectilinear slot boundary analogous to the first rectilinear slot boundary; and locate a top edge of the second slot boundary adjacent and centered below the second slot tag in the first image according to the first relative tag-boundary position.

10.7.4 Slot Boundary Checks

In one variation, the computer system further checks a predicted slot boundary calculated for an unmatched slot tag for collisions and adjusts or flags the slot boundary accordingly. For example, the computer system can reposition or downsize the predicted slot boundary to eliminate intersections with other slot boundaries in the inventory structure. Alternatively, in response to more than a threshold proportion (e.g., 40%) of the predicted slot boundary intersecting other slot boundaries in the inventory structure, the computer system can elect an alternative relative tag-boundary position—derived from the image—and recalculate the predicted slot boundary for the unmatched slot tag based on this alternative relative tag-boundary position.

10.7.5 Slot Condition for Unmatched Slot Tag

Then, in response to confirming the predicted slot boundary for the unmatched slot tag, the computer system can: (rescan the predicted slot boundary within the image for product units that correspond to the product type specified by the slot tag); and flag the slot—corresponding to the slot tag—as out-of-stock based on absence of product units of the product types corresponding to the slot tag within the predicted slot boundary.

10.8 Product Unit Detected: Relative Tag-Boundary Mapping

One variation, of the method S100 includes Block S110, which recites predicting a location of a slot tag, corresponding to an unmatched slot boundary, in the first image based on a position of the slot boundary in the first image and a relative tag-boundary position derived from another slot tag and slot boundary boundary pair detected in the image. Generally, in Block S110, the computer system can implement methods and techniques similar to those described above to predict a location of a slot tag based on a position of a cluster of like product types and relative a relative tag-boundary position derived from another slot tag and slot boundary pair detected in the image. More specifically, in response to failing to detect a particular slot tag—in the image—specifying a product identifier corresponding to a product type of a particular cluster of product units detected in the image, the computer system can leverage relative tag-boundary positions of other slot boundary and slot tag pairs detected in the image to predict a location of the particular slot tag.

10.8.1 Shelf Tag

In one example, the computer system: locates a first rectilinear slot boundary—around a first cluster of product units corresponding to a first product type—in the first image; associates this first slot boundary with a first slot tag specifying a corresponding product type; and derives a first relative tag-boundary position that defines a shelf tag location adjacent and below a first lower-left corner of the first rectilinear slot boundary based on positions of the first rectilinear slot boundary and the first slot tag in the first image. Accordingly, in response to detecting a second cluster of product units of a product type not specified in any slot tags detected in the image, the computer system can: define a second slot boundary around the second cluster of product units; and predict a second location of a second slot tag adjacent and below a lower-left corner of the second slot boundary.

For example, the computer system can: define an origin of the first slot boundary at a centroid of the first slot tag; store a position and orientation of the first slot boundary relative to the origin in the first relative tag-boundary position; locate and scale the first slot boundary and origin in the image to align the first and second slot boundaries; and thus define the predicted location of the second slot tag around this projected origin.

10.8.2 Hang Tag

In another example, the computer system: locates a first rectilinear slot boundary—around a first cluster of product units corresponding to a first product type—in the first image; associates this first slot boundary with a first slot tag specifying a corresponding product type; and derives a first relative tag-boundary position that defines a hand tag location adjacent and centered above the first rectilinear slot boundary based on positions of the first rectilinear slot boundary and the first slot tag in the first image. Accordingly, in response to detecting a second cluster of product units of a product type not specified in any slot tags detected in the image, the computer system can: define a second slot boundary around the second cluster of product units; and predict a second location of a second slot tag adjacent and centered above the second slot boundary.

10.8.3 Slot Condition for Unmatched Slot Boundary

The computer system can then rescan the image around the predicted slot tag location for slot tag features. Accordingly, in response to detecting absence of a slot tag and no or minimal glare proximal this predicted slot tag location in the image, the computer system can: predict absence of a slot tag for the unmatched slot boundary; generate a prompt to install a slot tag for the slot on the inventory structure; and serve this prompt to an associate of the store. Alternatively, in response to detecting remnants of a slot tag in this predicted slot tag location in the image, the computer system can: generate a prompt to replace a slot tag for the unmatched slot boundary on the inventory structure; and serve this prompt to an associate of the store. Yet alternatively, in response to detecting glare in the predicted slot tag location in the image, the computer system can: mute notifications related to this slot tag.

10.9 Stock Conditions

The computer system can then aggregate presence and absence of product units in slot boundaries in the image into stock conditions of corresponding slots in the inventory structure. In particular, in response to detecting a product unit within a slot boundary in the image, the computer system can flag or mark the corresponding slot in the inventory structure as in-stock. Conversely, in response to detecting absence of a product unit within a slot boundary in the image, the computer system can flag or mark the corresponding slot in the inventory structure as out-of-stock.

In one variation, the computer system further retrieves a quantity of product units (or product facings) assigned to the slot, such as by reading the quantity directly from the corresponding slot tag or by retrieving this quantity from a planogram of the store based on a slot address, product identifier, or other value read from the slot tag. Accordingly, in response to a quantity of product units of the product type detected in the slot boundary matching or approximating this quantity of product units (or product facings), the computer system can flag or mark the slot as fully-stocked.

10.10 Realogram

In one variation, the computer system stores locations of slot boundaries and slot tags—detected in the image—in a realogram of the store. More specifically, the computer system can compile locations of slot boundary and slot tag pairs derived from an image of an inventory structure into a record of actual slot definitions and slot tag tags within the inventory structure at a time the inventory structure was captured. The computer system can also update the realogram over time based on slot tag and slot boundary locations derived from subsequent images of the inventory structure.

In one implementation, the computer system: derives slot tag and slot boundary locations of a first slot and a second slot in an inventory structure based on features detected in an image captured (e.g., by the mobile robotic system or fixed camera) at a first time; stores a first location of a first slot tag detected in the image in a realogram of the store; stores a first slot boundary, associated with the first slot tag and calculated based on locations of corresponding product units detected in the image, in the realogram; stores a second location of a second slot tag, detected in the image, in the realogram; and temporarily stores a second slot boundary, associated with the second slot tag and predicted based on a relative tag-boundary position of the first slot tag and the first slot boundary, in the realogram. In this implementation, the computer system later executes the foregoing methods and techniques to process a second image of the inventory structure captured (e.g., by the mobile robotic system or fixed camera) at a second, later time and updates the realogram accordingly. More specifically, the computer system can: access a second image depicting the inventory structure at a second, later time; detect a third product unit in the second image; extract a third set of features, depicting the third product unit, from the second image; identify the third product unit as the second product type based on the third set of features; locate a revised second slot boundary, containing the third product unit, in the second image; detect a second slot tag in the second image; extract the second product identifier, from the second slot tag, depicted in the second image; associate the revised second slot boundary with the second slot tag in response to the second product identifier corresponding to the second product type; and replace the second slot boundary with the revised second slot boundary in the planogram in response to the second slot boundary differing from the revised second slot boundary.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
by a mobile robotic system:
autonomously navigating throughout a store during a scan cycle; and
via an optical sensor integrated in the mobile robotic system, capturing images of inventory structures in the store during the scan cycle; and
by a computer system:
accessing a first image depicting an inventory structure in the store at a first time during the scan cycle, the first image captured by the mobile robotic system;
detecting a first product unit in the first image;
extracting a first set of features, depicting the first product unit, from the first image;
identifying the first product unit as a first product type based on the first set of features;
locating a first slot boundary in the first image, the first slot boundary containing the first product unit and defining a first rectilinear slot boundary;
detecting a first slot tag in the first image;
extracting a first product identifier, from the first slot tag, depicted in the first image;
in response to the first product identifier corresponding to the first product type:
associating the first slot boundary with the first slot tag;
extracting a first relative tag-boundary position of the first slot boundary and the first slot tag from the first image, the first relative tag-boundary position defining a shelf tag location adjacent and below a first lower-left corner of the first rectilinear slot boundary based on positions of the first rectilinear slot boundary and the first slot tag in the first image; and
identifying the first slot boundary as in-stock at the first time;
detecting a second slot tag in the first image;
extracting a second product identifier, from the second slot tag, depicted in the first image;
defining a second slot boundary assigned to a second product type corresponding to the second product identifier, the second slot boundary defining a second rectilinear slot boundary analogous to the first rectilinear slot boundary;
locating a second lower-left corner of the second slot boundary adjacent and above the second slot tag in the first image;
scanning the first image for a second product unit corresponding to the second product identifier; and
in response to absence of the second product unit corresponding to the second product identifier within the second slot boundary in the first image, identifying the second slot boundary as out-of-stock at the first time.

2. The method of claim 1:
further comprising, by the computer system, deploying the mobile robotic system to autonomously navigate throughout the store during the scan cycle; and
wherein accessing the first image comprises:
accessing a sequence of photographic images captured by the mobile robotic system during the scan cycle while traversing an aisle facing the inventory structure; and
compiling the sequence of photographic images into the first image defining a composite photographic image depicting a set of shelving segments spanning the inventory structure.

3. The method of claim 1, wherein predicting the second slot boundary in the first image comprises defining the second slot boundary, adjacent and disjoint from the first slot boundary, in the first image based on the second position of the second slot tag in the first image and the first relative tag-boundary position.

4. The method of claim 1:
wherein extracting the first set of features from the first image comprises extracting the first set of features comprising color values and text strings from a first region of the first image depicting the first product unit; and
wherein identifying the first product unit as the first product type comprises:
retrieving a set of visual feature templates representing a set of product types in a product category associated with the inventory structure;
scanning the set of visual feature templates for features matching color values and text strings in the first set of features; and
identifying the first product unit as the first product type in response to the first set of features approximating a first visual feature template corresponding to the product type.

5. The method of claim 1, further comprising:
storing a first location of the first slot tag in a realogram of the store;
storing the first slot boundary, associated with the first slot tag, in the realogram;
storing a second location of the second slot tag in the realogram; and
temporarily storing the second slot boundary, associated with the second slot tag, in the realogram.

6. The method of claim 5, further comprising:
accessing a second image depicting the inventory structure at a second time succeeding the first time;
detecting a third product unit in the second image;
extracting a third set of features, depicting the third product unit, from the second image;
identifying the third product unit as the second product type based on the third set of features;
locating a revised second slot boundary, containing the third product unit, in the second image;
detecting the second slot tag in the second image;
extracting the second product identifier, from the second slot tag, depicted in the second image;
in response to the second product identifier corresponding to the second product type, associating the revised second slot boundary with the second slot tag; and
in response to the second slot boundary differing from the revised second slot boundary:
replacing the second slot boundary with the revised second slot boundary in the realogram.

7. The method of claim 6, wherein accessing the second image comprises accessing the second image comprising a photographic image captured by a fixed camera, arranged within the store and facing the inventory structure, at the second time.

8. The method of claim 6, wherein accessing the second image comprises accessing the second image captured by the mobile robotic system during a second scan cycle succeeding the first scan cycle.

9. The method of claim 1:
further comprising:
  detecting a third slot tag in the first image; and
  extracting a third product identifier, from the third slot tag, depicted in the first image; and
wherein defining the second slot boundary comprises:
  characterizing a first distance between the first slot tag and the second slot tag;
  characterizing a second distance between the third slot tag and the second slot tag; and
  in response to the second distance exceeding the first distance:
    predicting correspondence of slot format between the first slot tag and the second slot tag; and
    predicting the second slot boundary in the first image based on:
      the second position of the second tag in the first image; and
      the first relative tag-boundary position.

10. The method of claim 9:
further comprising:
  detecting a fourth slot tag in the first image;
  extracting a fourth product identifier, from the fourth slot tag, depicted in the first image;
  characterizing a first height of the first slot tag in the first image;
  characterizing a second height of the second slot tag in the first image;
  characterizing a third height of the third slot tag in the first image; and
  characterizing a fourth height of the fourth slot tag in the first image; and
wherein predicting correspondence of slot format between the first slot tag and the second slot tag comprises:
  associating the first slot tag, the second slot tag, and the third slot tag with a first slot row in the inventory structure based on the first height, the second height, and the third height;
  associating the fourth slot tag with a second slot row in the inventory structure based on the fourth height; and
  predicting correspondence of slot format between the first slot tag and the second slot tag:
    based on association of the first slot tag and the second slot tag with the first slot row; and
    in response to the second distance exceeding the first distance.

11. The method of claim 1, further comprising:
detecting a third product unit in the first image;
extracting a third set of features, depicting the third product unit, from the first image;
identifying the third product unit as a third product type based on the third set of features;
locating a third rectilinear slot boundary, containing the third product unit, in the first image;
detecting a third slot tag in the third image;
extracting a third product identifier, from the third slot tag, depicted in the first image;
in response to the third product identifier corresponding to the third product type:
  associating the third slot boundary with the third slot tag;
  extracting a third relative tag-boundary position of the third slot boundary and the third slot tag from the first image, the third relative tag-boundary position defining:
    a hang tag location centered above the third rectilinear slot boundary based on positions of the third rectilinear slot boundary and the third slot tag in the first image; and
  identifying the third slot boundary as in-stock at the first time;
detecting a fourth slot tag in the first image;
extracting a fourth product identifier, from the fourth slot tag, depicted in the first image;
defining a fourth slot boundary comprising a fourth rectilinear slot boundary analogous to the third rectilinear slot boundary;
locating a bottom edge of the fourth slot boundary adjacent and centered below the fourth slot tag in the first image;
scanning the first image for a fourth product unit corresponding to the fourth product identifier; and
in response to absence of the fourth product unit corresponding to the fourth product identifier within the fourth rectilinear slot boundary in the first image, identifying the fourth rectilinear slot boundary as out-of-stock at the first time.

12. The method of claim 1, further comprising, in response to presence of the second product unit corresponding to the second product identifier within the second slot boundary in the first image, identifying the second slot boundary as in-stock at the first time.

13. A method comprising:
by a mobile robotic system:
- autonomously navigating throughout a store during a scan cycle; and
- via an optical sensor integrated in the mobile robotic system, capturing images of inventory structures in the store during the scan cycle; and by a computer system:
- accessing a first image depicting an inventory structure in a store at a first time, the first image captured by the mobile robotic system during the scan cycle;
- detecting a first product unit in the first image;
- extracting a first set of features, depicting the first product unit, from the first image;
- identifying the first product unit as a first product type based on the first set of features;
- locating a first slot boundary, containing the first product unit, in the first image;
- detecting a first slot tag in the first image;
- extracting a first product identifier, from the first slot tag, depicted in the first image;
- in response to the first product identifier corresponding to the first product type:
  - associating the first slot boundary with the first slot tag; and
  - extracting a first relative tag-boundary position of the first slot boundary and the first slot tag from the first image;
- detecting a second product unit in the first image;
- extracting a second set of features, depicting the second product unit, from the first image;
- identifying the second product unit as a second product type based on the second set of features;
- locating a second slot boundary, containing the second product unit, in the first image;
- detecting a second slot tag in the first image;
- extracting a second product identifier, from the second slot tag, depicted in the first image;
- in response to the second product identifier corresponding to the second product type, associating the second slot boundary with the second slot tag;
- detecting a third slot tag in the first image;
- extracting a third product identifier, from the third slot tag, depicted in the first image;
- characterizing a first distance between the first slot tag and the second slot tag;
- characterizing a second distance between the second slot tag and the third slot tag; and
- in response to absence of the third product unit corresponding to the third product identifier within the third slot boundary in the first image and in response to the second distance exceeding the first distance:
  - predicting a third slot boundary, assigned to a third product type corresponding to the third product identifier, in the first image based on:
    - a third position of the third tag in the first image; and
    - the first relative tag-boundary position.

14. The method of claim 13:
wherein locating the first slot boundary in the first image comprises locating the first slot boundary, defining a first rectilinear slot boundary, in the first image;
wherein extracting the first relative tag-boundary position of the first slot boundary and the first slot tag from the first image comprises extracting the first relative tag-boundary position defining:
- a hang tag location centered above the first rectilinear slot boundary based on positions of the first rectilinear slot boundary and the first slot tag in the first image; and wherein predicting the third slot boundary comprises:
- defining the third slot boundary comprising a second rectilinear slot boundary analogous to the first rectilinear slot boundary; and
- locating a top edge of the third slot boundary adjacent and centered below the third slot tag in the first image.

15. The method of claim 13, further comprising:
- in response to the first product identifier corresponding to the first product type, identifying the first slot boundary as in-stock at the first time; and
- in response to absence of the second product unit corresponding to the second product identifier within the second slot boundary in the first image, identifying the second slot boundary as out-of-stock at the first time.

16. The method of claim 13, further comprising:
further comprising deploying a mobile robotic system to autonomously navigate throughout the store during a scan cycle, the robotic system comprising an optical sensor; and
wherein accessing the first image comprises:
- accessing a sequence of photographic images captured by the robotic system during the scan cycle while traversing an aisle facing the inventory structure; and
- compiling the sequence of photographic images into the first image defining a composite photographic image depicting a set of shelving segments spanning the inventory structure.

17. A method comprising:
by a mobile robotic system:
- autonomously navigating throughout a store during a scan cycle; and
- via an optical sensor integrated in the mobile robotic system, capturing images of inventory structures in the store during the scan cycle; and by a computer system:
- accessing a first image depicting an inventory structure in a store at a first time, the first image captured by the mobile robotic system during the scan cycle;
- detecting a first product unit in the first image;
- extracting a first set of features, depicting the first product unit, from the first image;
- identifying the first product unit as a first product type based on the first set of features;
- locating a first slot boundary, containing the first product unit, in the first image;
- detecting a first slot tag in the first image;
- extracting a first product identifier, from the first slot tag, depicted in the first image;
- in response to the first product identifier corresponding to the first product type:
  - associating the first slot boundary with the first slot tag;
  - extracting a first relative tag-boundary position of the first slot boundary and the first slot tag from the first image, the first relative tag-boundary position defining a hang tag location centered above the first slot boundary based on positions of the first slot boundary and the first slot tag in the first image; and
  - identifying the first slot boundary as in-stock at the first time;

detecting a second product unit in the first image;
extracting a second set of features, depicting the second product unit, from the first image;
identifying the second product unit as a second product type based on the second set of features;
locating a second slot boundary, containing the second product unit, in the first image;
locating a second location of a second slot tag, corresponding to the second slot boundary adjacent and centered above the second slot boundary in the first image; and
in response to detecting absence of the second slot tag in the second location in the first image, flagging the second slot boundary as missing the second slot tag.

18. The method of claim 17:
further comprising:
detecting a third product unit, adjacent the second product unit, in the first image;
extracting a third set of features, depicting the third product unit, from the first image; and
identifying the third product unit as the second product type based on the third set of features; and
wherein locating the second slot boundary in the first image comprises locating the second slot boundary, containing the second product unit and the third product unit, in the first image.

19. The method of claim 18, further comprising:
locating a third rectilinear slot boundary, containing the third product unit, in the first image;
detecting a third slot tag in the third image;
extracting a third product identifier, from the third slot tag, depicted in the first image; and
in response to the third product identifier corresponding to the third product type:
associating the third slot boundary with the third slot tag;
extracting a third relative tag-boundary position of the third slot boundary and the third slot tag from the first image, the third relative tag-boundary position defining a shelf tag location adjacent and proximal a first lower-left corner of the third rectilinear slot boundary based on positions of the third rectilinear slot boundary and the third slot tag in the first image; and
identifying the third slot boundary as in-stock at the first time.

20. The method of claim 19, further comprising:
detecting a fourth slot tag in the first image;
extracting a fourth product identifier, from the fourth slot tag, depicted in the first image;
defining a fourth slot boundary comprising a fourth rectilinear slot boundary analogous to the third rectilinear slot boundary;
locating a second lower-left corner of the fourth slot boundary adjacent and above the fourth slot tag in the first image;
scanning the first image for a fourth product unit corresponding to the fourth product identifier; and
in response to absence of the fourth product unit corresponding to the fourth product identifier within the fourth rectilinear slot boundary in the first image, identifying the fourth rectilinear slot boundary as out-of-stock at the first time.

* * * * *